(12) United States Patent
Decker et al.

(10) Patent No.: US 10,190,917 B2
(45) Date of Patent: Jan. 29, 2019

(54) SURFACE TEMPERATURE PROBE

(71) Applicant: ABB Schweiz AG, Baden (CH)

(72) Inventors: Andreas Decker, Darmstadt (DE);
Joerg Gebhardt, Mainz (DE); Paul Szasz, Plankstadt (DE); Stephan Wildermuth, Laudenbach (DE)

(73) Assignee: ABB SCHWEIZ AG, Baden (CH)

( * ) Notice: Subject to any disclaimer, the term of this patent is extended or adjusted under 35 U.S.C. 154(b) by 192 days.

(21) Appl. No.: 15/216,722

(22) Filed: Jul. 22, 2016

(65) Prior Publication Data
US 2017/0023415 A1 Jan. 26, 2017

(30) Foreign Application Priority Data

Jul. 23, 2015 (DE) .................... 20 2015 103 863 U

(51) Int. Cl.
| | | |
|---|---|---|
| *G01K 1/00* | (2006.01) | |
| *G01K 13/00* | (2006.01) | |
| *G01K 7/00* | (2006.01) | |
| *G01K 1/14* | (2006.01) | |
| *G01K 1/16* | (2006.01) | |
| *G01K 1/08* | (2006.01) | |

(52) U.S. Cl.
CPC .................. *G01K 1/14* (2013.01); *G01K 1/08* (2013.01); *G01K 1/143* (2013.01); *G01K 1/16* (2013.01)

(58) Field of Classification Search
USPC ........................................ 374/208, 147, 163
See application file for complete search history.

(56) References Cited

U.S. PATENT DOCUMENTS

| | | | | |
|---|---|---|---|---|
| 5,172,979 A * | 12/1992 | Barkley | ................ | G01K 1/143 374/147 |
| 5,454,641 A * | 10/1995 | Parker | .................... | G01K 1/143 236/DIG. 6 |
| 8,177,425 B2 * | 5/2012 | Grundmann | ........... | G01K 13/02 374/147 |
| 2017/0016775 A1* | 1/2017 | Decker | .................. | G01K 1/143 |

* cited by examiner

*Primary Examiner* — Mirellys Jagan
(74) *Attorney, Agent, or Firm* — Leydig, Voit & Mayer, Ltd.

(57) ABSTRACT

A surface temperature sensor has a first geometric contact surface for determining the temperature in a vessel and a second geometric contact surface, wherein the first geometric contact surface and the second geometric contact surface are in point and/or linear contact and at least partially spaced variably from this. For improvement of thermal contact an adapter between the first geometric contact surface and the second geometric contact surface may be made of metal, whereby the process vessel facing side has a polygonal surface structure and the temperature sensor facing side of a sack-shaped recess.

18 Claims, 4 Drawing Sheets

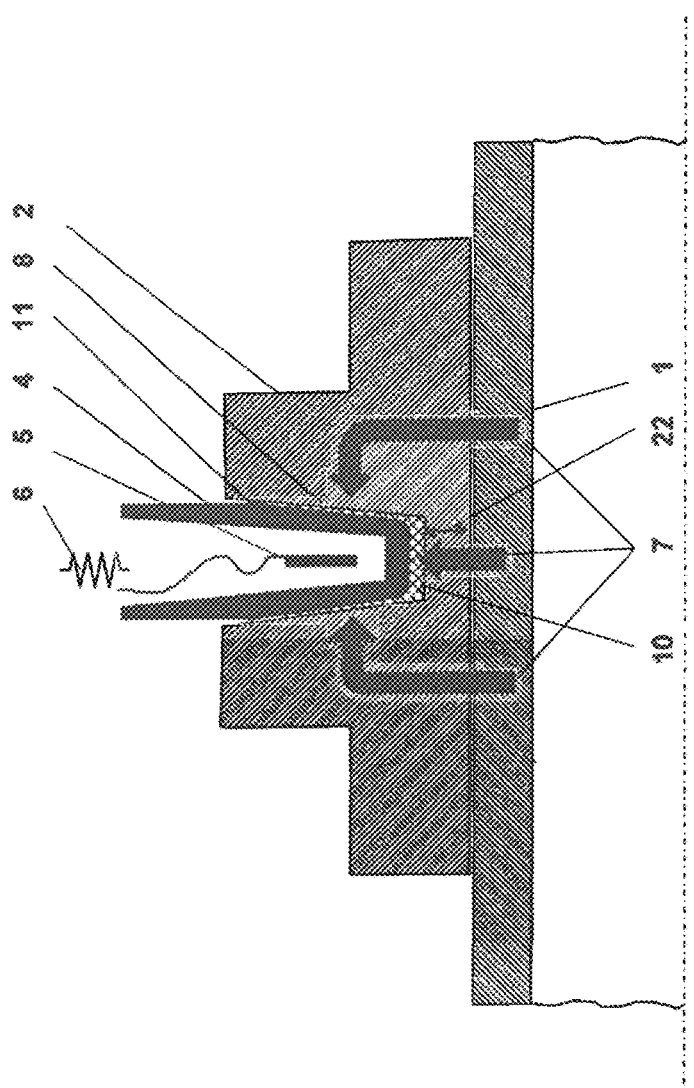

SURFACE TEMPERATURE PROBE

CROSS-REFERENCE TO RELATED APPLICATIONS

Priority is claimed to German Patent Application No. DE 20 2015 103 863.1, filed on Jul. 23, 2015, the entire disclosure of which is hereby incorporated by reference herein.

FIELD

The invention relates to a surface temperature probe for industrial use.

BACKGROUND

Industrial surface temperature probes are known, per se, in a number of designs. Common to most of said probes is the fact that the actual temperature sensor element—usually a Pt100 resistor or a thermocouple—is encapsulated in a metal housing in order to prevent damage in tough industrial environments. Additional adapter structures (plates, clamps) are often used in order to allow attachment to a process pipe or vessel. The sensor arrangement thus formed is brought into contact with the process pipe or container at which the temperature is to be measured. The measuring accuracy of such sensor arrangements is strongly influenced by the thermal resistance of the contact between the process pipe or container and the sensor housing or the adapter structure.

Due to technical quality, such as surface roughness and tolerances, the actual body contact on the process pipe is limited to just a few point contacts, for example if two planar, but not perfectly level surfaces contact one another, or in the best case line contacts, for example between a pipe and a plate, the contact surfaces being small in comparison to the overall surface of the sensor element. This leads to a very high heat transmission resistance and thus to long reaction times and significant steady-state deviations between the actual surface temperature and the measured value. In this case, the deviations can certainly exceed 10° C.

It is generally known to reduce the heat transmission resistance between two thermally coupled elements by means of additional thermal bridges which are formed by adapter elements that conduct a heat flow from the vessel laterally to the temperature probe.

Whilst the heat transmission resistance between the adapter element and the vessel can be kept low on account of a large-surface-area design having a plurality of contact points, the heat transmission between the temperature probe and the adapter element is limited due to the small number of contact points resulting from the small dimensions of the temperature probe.

The fact that the temperature probe is required to be replaceable means that a permanent connection which effectively conducts heat, produced for example by welding, soldering or shrinkage, is not an option.

Known structures usually have an extremely high thermal resistance, and yet they also disadvantageously have long reaction times and major steady-state deviations between the actual surface temperature and the measured value. The deviations can exceed 10° C. even for actual surface temperatures of less than 100° C.

The use of thermal interface materials, such as heat-conducting pastes, does not provide many benefits either since the geometry of the contact surfaces does not make it possible to retain such means over a long period of time. The thermal interface materials run off the contact surfaces or dry out over time. This increases the heat transmission resistance between the contact surfaces, and as this resistance increases, so too does the number of measurement errors.

Known semiliquid interface materials are designed for space widths of less than 0.1 mm such that they can reap all the benefits of capillary storage. In order for semiliquid interface materials to have a reasonable service life, the space widths must not exceed 0.5 mm, particularly if the interface enables the semiliquid interface material to flow freely under the effect of gravity. In the industry, however, space widths are rarely kept this narrow.

SUMMARY

An aspect of the invention provides a surface temperature probe, comprising: a first geometric contact surface configured to determine a temperature in a vessel including a second geometric contact surface, the first geometric contact surface contacting the second geometric contact surface in a punctiform and/or linear manner and being variably spaced apart from the second contact surface at least in part; and a metal adapter, provided between the first geometric contact surface and the second geometric contact surface, wherein a side of the metal adapter facing the vessel has a polygonal surface structure, and wherein a side of the metal adapter facing the temperature probe includes a sack-shaped recess.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 is a partial sectional view.

DETAILED DESCRIPTION

Figure 1:
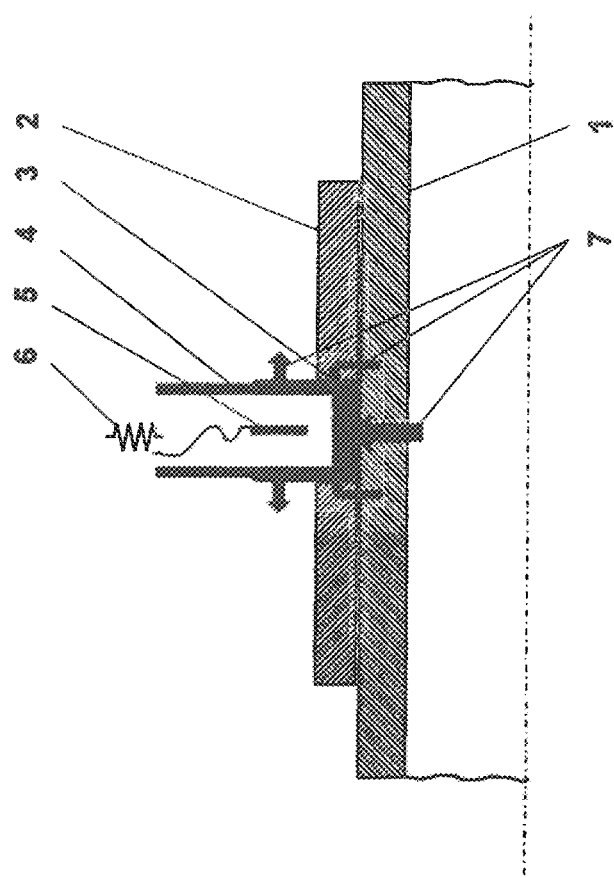
FIG. 1 is a partial sectional view of a known surface temperature probe arrangement.

Therefore, an aspect of the invention is to provide a surface temperature probe, the thermal contact of which on the contact surface of the pipe or container is designed to have long-term stability over a wide temperature range, while having a low heat transmission resistance and being designed for bridging gaps having variable thickness variations.

An aspect of the invention proceeds from a surface temperature probe comprising a first geometric contact surface for determining the temperature in a vessel comprising a second geometric contact surface, the first geometric contact surface contacting the second geometric contact surface in a punctiform and/or linear manner and being variably spaced apart from said second contact surface at least in part.

According to an aspect of the invention, a metal adapter is provided between the first geometric contact surface and the second geometric contact surface, the side of which facing the process vessel has a "polygonal" surface structure, i.e. which, in this case, is flat in portions or is made up of flat sections, and the side of which facing the temperature probe has a sack-shaped recess.

The adapter is preferably made of metal, with aluminum, copper or steel being particularly suitable. The polygonal surface structure of the adapter can result, for example, in at least two linear contacts with the process vessel if it is formed such that it remains unchanged when moved in parallel with the axis of the process tube. This results in a low heat transmission resistance between the process vessel and the adapter.

The temperature probe is housed in the sack-shaped recess. As a result, the tip of the temperate probe is substantially enclosed in the adapter. This advantageously results in a low heat transmission resistance between the temperature probe and the adapter.

According to another feature of the invention, the depth of the sack-shaped recess is at least twice the largest lateral extension of the sack-shaped recess. Advantageously, the region of the temperature probe in which the actual sensor element is located is as far away as possible from the adapter.

According to another feature of the invention, the sack-shaped recess is conical, i.e. tapered in its depth.

According to another feature of the invention, the tip of the temperature probe is conical, i.e. distally tapered.

According to another feature of the invention, the taper of the sack-shaped recess and the taper of the tip of the temperature probe are the same.

When the temperature probe is fitted to the adapter, a planar joint which has low thermal resistance is advantageously produced.

According to another feature of the invention, the taper of the sack-shaped recess is less than the taper of the tip of the temperature probe. More specifically, the sack-shaped recess is tapered by an inclination angle of at least 7°. The inclination angle is preferably at least 12°.

According to another feature of the invention, the inclination angle by which the tip of the temperature probe is tapered is slightly greater than the inclination angle by which the sack-shaped recess is tapered. More specifically, the difference between the tapers is between 0.5° and 1°.

When the temperature probe is fitted to the adapter, an annular joint which has low thermal resistance is advantageously produced. This joint advantageously results in a space between the adapter and the temperature probe which is almost completely enclosed.

According to another feature of the invention, the intermediate spaces between the process vessel and the adapter are filled with a thermal interface material.

Heat-conducting pastes, heat-conductive organic materials (which are for example silicon-based), conducting adhesives and metals are particularly suitable for this purpose. The fact that the space is almost completely enclosed means that the risk of the heat-conductive material degrading or disappearing during the service life of the device is significantly reduced.

The thermal transmission resistance of the interface in question is advantageously reduced even further.

According to another feature of the invention, the bottom of the sack-shaped recess is very thin, preferably having a wall thickness of less than 0.5 mm. This advantageously reduces the thermal transmission resistance between the process vessel and the temperature probe.

According to another feature of the invention, with respect to the process vessel, the adapter is thin in the radial direction and wide in the tangential direction. As a result, there is particularly low thermal transmission resistance between the process vessel and the adapter.

According to another feature of the invention, the side of the adapter facing the process vessel is adapted to the contour of the process vessel such that the distance from the adapter to the surface of the process vessel is at most 0.5 mm over a surface area of at least 4 $cm^2$. More specifically, the side of the adapter facing the process vessel has a polygonal structure.

According to another feature of the invention, the adapter and/or the tip of the temperature probe are coated with a soft metal. In particular, but not exclusively, tin and silver are suitable for this purpose. Consequently, the metal contact surfaces are enlarged even when the contact forces are moderate.

Overall, the surface temperature probe arrangement according to the invention has a plurality of advantages.

The metal adapter, which is in particular made of aluminum, has high thermal conductivity and low hardness. Owing to the low hardness, if there are significant mounting forces, the contact lines are plastically deformed to a certain extent and thus the contact surface area is increased. This means that slight differences in distance between the contact partners are compensated, and so the quality of thermal contact increases.

The polygonal structured surface of the side of the adapter facing the process vessel brings about defined and reproducible thermal contact by means of two metal heat-conducting contacts and a defined space which can be filled with heat-conducting paste. The defined line contacts contribute to keeping the heat-conducting paste within the thermally relevant region. This ensures that there is good thermal contact over a long period of time.

Lowering the temperature probe into the sack-shaped recess in the adapter improves the heat flow from the adapter to the temperature sensor, since the side walls are in the heat flow. The fact that the actual temperature detection element is arranged directly above the planar base plate means that heat flows from the sensor to the sides more rapidly and effectively. This improves both the accuracy and the reaction time of the temperature probe.

Owing to the conical shape of the sensor tip and of the sack-shaped recess in the adapter, there is at least one substantially annular metal heat-conducting contact between the two components. At the same time, this heat-conducting contact sealingly closes the space between the sensor tip and the bottom of the sack-shaped recess in the adapter. This prevents leaks and prevents a heat-conducting paste contained in this space from running off. In a long-term stable manner, this results in high measurement accuracy and short reaction times, particularly at high temperatures of up to 100° C.

The inclinations of the tapers are selected such that they enable the temperature sensor to be fitted and removed for replacement and servicing without running the risk of it getting stuck, even when high forces are applied, so as to produce strong contact.

FIG. 1 is a partial sectional view of a known surface temperature probe arrangement. A surface temperature probe substantially consisting of a sensor 5 housed in a sensor housing 4 is arranged on a vessel wall 1 of a process vessel together with an adapter 2. The sensor 5 is loaded by means of a spring 6 which presses the sensor 5 onto the bottom of the sensor housing 4 in a housed manner. The adapter 2 comprises a through-hole 3 in which the sensor housing 4 is housed in part. Tolerances maintain a gap between the sensor housing 4 and the wall of the through-hole 3. Furthermore, the sensor housing 4 thermally conductively contacts the vessel wall 1 only in a punctiform manner.

FIG. 1 also shows the heat flow 7 in this known arrangement. In this arrangement, a first heat flow 7 enters the sensor housing 4 directly from the vessel wall 1, which flow is restricted by the punctiform and heat-conducting contact. A second heat flow 7 enters the sensor housing 4 via the adapter 2, which flow is restricted by the gap. In a third heat flow 7, heat flows away from the sensor housing 4 in the region of the sensor housing 4 which is not covered by the adapter 2.

Figure 2:
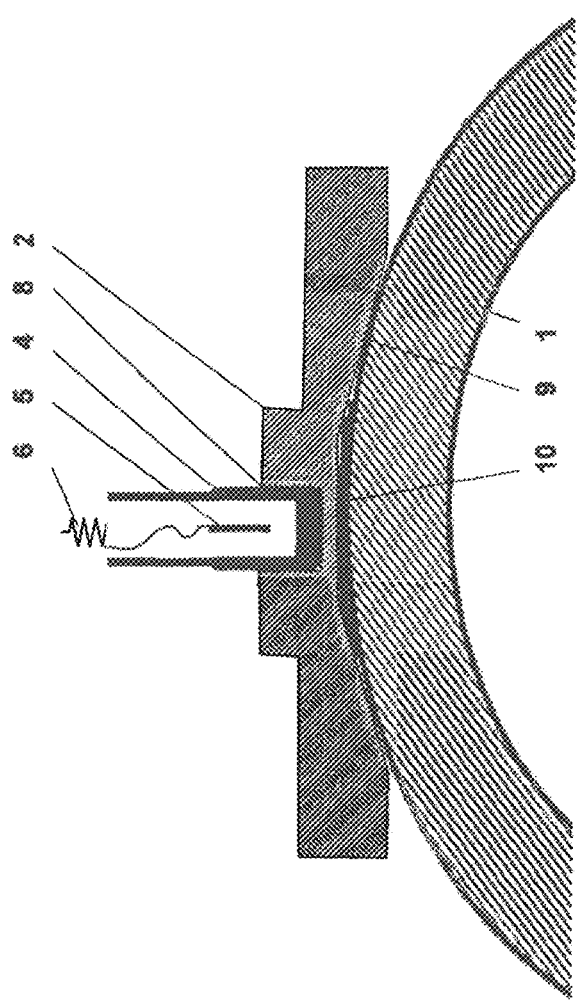
FIG. 2 is a partial sectional schematic view of a surface temperature probe arrangement on a curved vessel wall.

Using the same reference numerals for the same features, according to the features of the invention, FIG. 2 is a partial sectional schematic view of a surface temperature probe arrangement. The adapter 2 is made of metal, preferably aluminum, copper or steel, and has, on the side facing the vessel wall 1, a polygonal surface structure which results in at least two linear, heat-conducting contacts 9 between the adapter 2 and the vessel wall 1. The space between the adapter 2 and the vessel wall 1 is filled with a heat-conducting paste 10. Owing to the linear contacts 9 between the adapter 2 and the vessel wall 1, the heat-conducting paste 10 is housed in a space which is largely closed and is prevented from escaping.

The adapter 2 also comprises, on the side thereof facing the sensor housing 4, a sack-shaped recess 8 in which the temperature probe is housed and which will be explained in more detail below.

Figure 3:
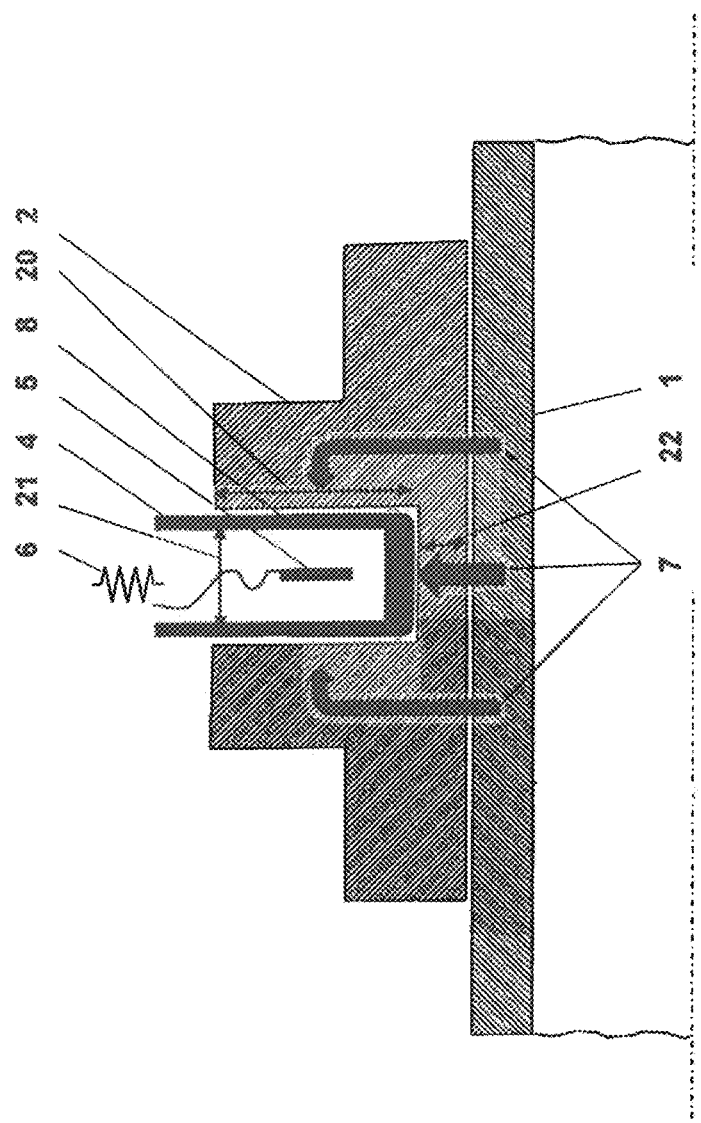
FIG. 3 is an enlarged schematic view of a known surface temperature probe arrangement on a vessel wall.

Using the same reference numerals for the same features, FIG. 3 is an enlarged partial sectional schematic view of a surface temperature probe arrangement. The sack-shaped recess 8 in the adapter 2 has a depth 20. The bottom of the recess 8 has a thickness 22 such that the total of the depth 20 and the thickness 22 is equal to the material thickness of the adapter 2 at the point where the temperature probe is located.

In a preferred embodiment of the invention, the thickness 22 is less than 0.5 mm. This means that there is a low heat transmission resistance and thus a high heat flow 7 between the vessel wall 1 of the process vessel and the sensor housing 4 of the temperature probe.

The sensor housing 4 of the temperature probe has a width 21. When the sensor housing 4 is cylindrical, the width 21 is equal to the diameter of the sensor housing 4.

In a preferred embodiment of the invention, the depth 20 is at least twice the width 21. As a result, the sensor 5 of the temperature probe largely surrounded by the adapter. This means that there is a low heat transmission resistance and thus a high heat flow 7 between the adapter 2 and the sensor housing 4 of the temperature probe.

Using the same reference numerals for the same features, FIG. 4 is a partial sectional schematic view of a surface temperature probe arrangement comprising a conical sensor housing 4. In this arrangement, the tip of the sensor housing 4 of the temperature probe is conical, i.e. distally tapered, and the sack-shaped recess 8 is conical, i.e. tapered in its depth.

In a particularly preferred embodiment of the invention, the inclination angle by which the tip of the sensor housing 4 is tapered is slightly greater than the inclination angle by which the sack-shaped recess 8 is tapered. This means that an annular contact 11 between the sensor housing 4 and the adapter 2 is formed close to the opening in the recess 8.

The space between the sensor housing 4 and the adapter 2 is filed with a heat-conducting paste 10. The annular contact 11 between the sensor housing 4 and the adapter 2 prevents any heat-conducting paste 10 from being lost.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1 vessel wall
2 adapter
3 through-hole
4 sensor housing
5 sensor
6 spring
7 heat flow
8 recess
9 linear contact
10 heat-conducting paste
11 annular contact
12 depth
21 width
22 thickness

The invention claimed is:
1. A surface temperature probe assembly, comprising:
a surface temperature probe having a first geometric contact surface configured to determine a temperature in a vessel, the vessel having a second geometric contact surface, the first geometric contact surface contacting the second geometric contact surface in a punctiform and/or linear manner and being variably spaced apart from the second contact surface at least in part; and
a metal adapter, provided between the first geometric contact surface and the second geometric contact surface,
wherein a side of the metal adapter facing the vessel has a polygonal surface structure, and wherein a side of the metal adapter facing the surface temperature probe includes a sack-shaped recess.

2. The assembly of claim 1, wherein a depth of the sack-shaped recess is at least twice a largest lateral extension of the sack-shaped recess.

3. The assembly of claim 1, wherein the sack-shaped recess is conical.

4. The assembly of claim 1, wherein a tip of the temperature probe is conical.

5. The assembly of claim 1, wherein a tip of the temperature probe is distally tapered.

6. The assembly of claim 1, wherein intermediate spaces between the vessel and the metal adapter are filled with a thermal interface material.

7. The assembly of claim 1, wherein intermediate spaces between the vessel and the metal adapter include a thermal interface material.

8. The assembly of claim 1, wherein intermediate spaces between the temperature probe and the metal adapter are filled with a thermal interface material.

9. The assembly of claim 1, wherein intermediate spaces between the temperature probe and the metal adapter include a thermal interface material.

10. The assembly of claim 1, wherein a bottom of the sack-shaped recess is very thin.

11. The assembly of claim 1, wherein a bottom of the sack-shaped recess has a wall thickness of less than 0.5 mm.

12. The assembly of claim 1, wherein, with respect to the vessel, the adapter is thin in a radial direction and wide in a tangential direction.

13. The assembly of claim 1, wherein the side of the metal adapter facing the vessel has a polygonal structure.

14. The assembly of claim 1, wherein the metal adapter and/or a tip of the temperature probe is coated with a soft metal.

15. The assembly of claim 1, wherein the sack-shaped recess is tapered in its depth.

16. The assembly of claim 15, wherein the taper of the sack-shaped recess and a taper of a tip of the temperature probe are the same.

17. The assembly of claim 1, wherein the sack-shaped recess is tapered in its depth, and wherein a tip of the temperature probe is distally tapered.

18. The assembly of claim 17, wherein the taper of the sack-shaped recess and the taper of the tip of the temperature probe are the same.

* * * * *